United States Patent [19]

Nilsson

[11] Patent Number: 4,586,392

[45] Date of Patent: May 6, 1986

[54] MOTION TRANSMITTING MECHANISM

[75] Inventor: Sven Nilsson, Partille, Sweden

[73] Assignee: SKF Nova AB, Goteborg, Sweden

[21] Appl. No.: 554,941

[22] Filed: Nov. 25, 1983

[30] Foreign Application Priority Data

Jan. 25, 1983 [SE] Sweden ............................. 8300361

[51] Int. Cl.⁴ ............................................. F16H 29/02
[52] U.S. Cl. .................................. 74/89.15; 74/109;
74/411; 74/424.8 VA; 251/64; 251/228;
251/229; 251/250
[58] Field of Search ...................... 74/89.15, 109, 411,
74/424.8 VA X; 251/64, 228, 229, 250, 288, 337

[56] References Cited

U.S. PATENT DOCUMENTS

| | | | |
|---|---|---|---|
| 2,640,694 | 6/1953 | Jackson | 74/89.15 |
| 3,473,397 | 10/1969 | Fry | 74/424.8 VA |
| 3,691,858 | 9/1972 | Wilke | 74/89.15 |
| 3,751,998 | 8/1973 | Vasilatos | 74/89.15 |
| 4,425,814 | 1/1984 | Dick | 74/89.15 |
| 4,442,725 | 4/1984 | Urabe | 74/89.15 |
| 4,479,397 | 10/1984 | Jelinek et al. | 74/89.15 |

Primary Examiner—Martin P. Schwadron
Assistant Examiner—Stephen M. Hepperle
Attorney, Agent, or Firm—Eugene E. Renz, Jr.

[57] ABSTRACT

In a motion transmitting mechanism comprising a linearly moveable member (3) operating to and from an end stop, a compressible spring (9) is arranged between the linearly moveable member (5) and a supporting surface (10), whereby the spring is compressed when the member (5) approaches the end position and gives a force on the member (5) directed away from the supporting surface when the member is in its end position.

1 Claim, 1 Drawing Figure

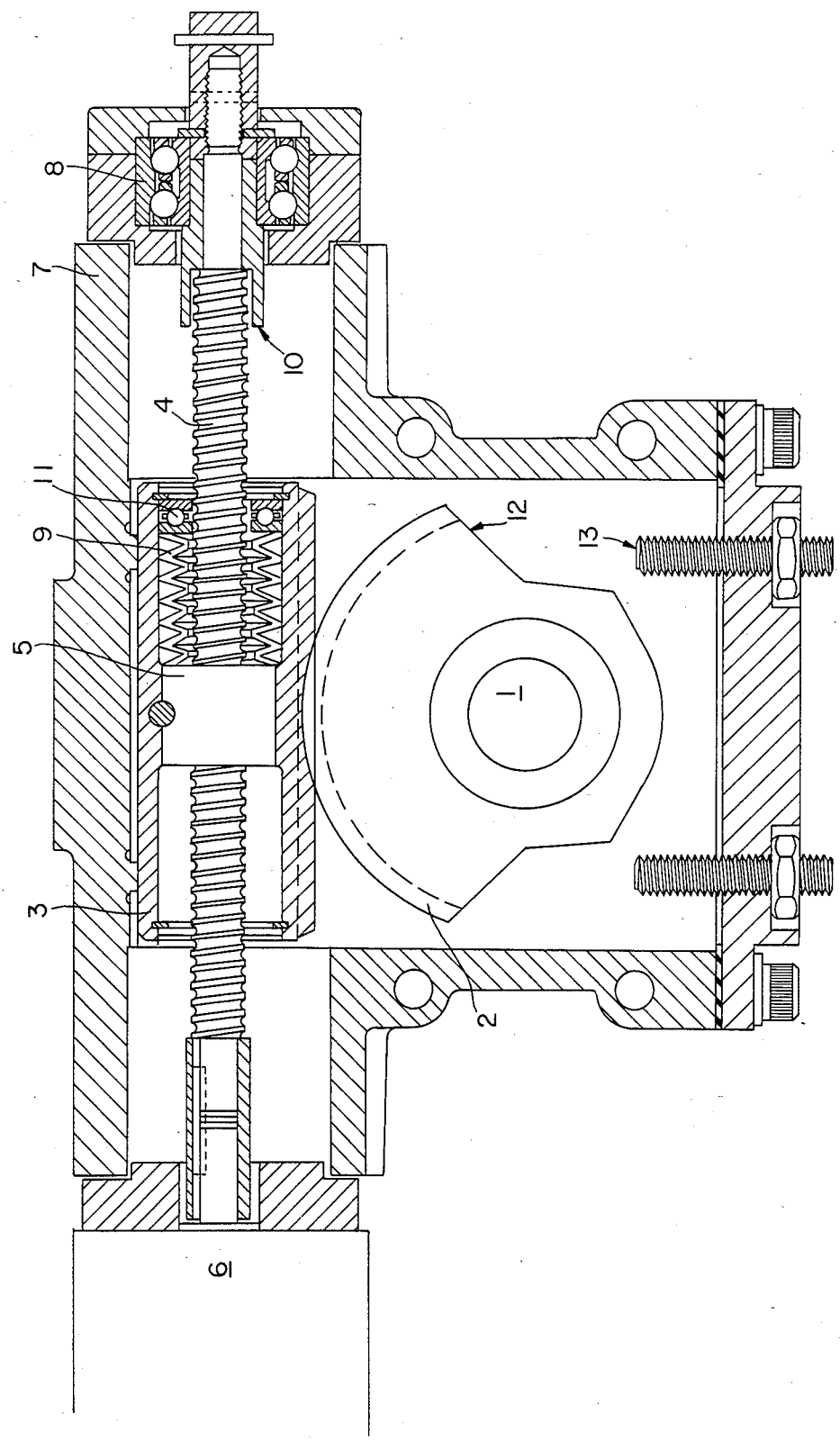

MOTION TRANSMITTING MECHANISM

FIELD OF THE INVENTION

The invention relates to a motion transmitting mechanism.

BACKGROUND OF THE INVENTION

An example of such a device is a valve regulator in which the valve control is carried out by a rotatable control member in the shape of a cog wheel or a cog sector, which is operated by a linearly moveable member in the shape of a toothed rack, which can be connected to or be part of a nut which co-operates with a rotatable screw, the rotation of the screw controlling the operation of the valve. The screw may, for example, be driven by an electric monitor which is controlled in any suitable way.

In motion transmitting mechanisms working intermittently, e.g., valve regulators, there is frequently a considerable difference between the force required to start motion and the force required to maintain the motion. This is due to the fact that the coefficient of static friction is, generally, higher than the coefficient of sliding friction and that an apparatus is generally difficult to start after a time of immobility. Specifically, it may be difficult to open or close valves which have been completely closed or open for a while. A conventional driving mechanism for this purpose must, therefore, be dimensioned for a great force, which is developed only a short time during each motion occasion.

SUMMARY OF THE INVENTION

One object of the present invention is to provide a device of the kind referred to in the introduction, in which a linearly moveable member can be started from an end position with the least possible force, whereby cost savings can be made by, e.g., using a drive monitor with a low maximum torque.

This object is achieved according to the present invention by providing the mechanism with the characterizing features defined in the appended claim 1.

A device according to the invention is also shock absorbing and it can pre-load the linearly moveable member at its end position, which diminishes the vibration sensibility of the mechanism.

The following is a detailed description of the invention with reference to the accompanying drawing, which shows a section of a device according to one embodiment of the invention in a control member for a valve.

DESCRIPTION OF THE PREFERRED EMBODIMENT

The device comprises a rotatable shaft 1 connected to the valve, not shown. A cog sector 2 is fixed to the shaft and co-operates with a toothed rack 3 which is linearly moveable by means of a rotatable screw 4 which co-operates with a nut 5 provided in a bore in the toothed rack. As an alternative to the nut 5, the bore of the rack 3 can be directly threaded. The screw is connected to a driving motor 6 at one end, and the other end is mounted in a bearing 8 in a housing 7. The toothed rack is moveable to and from an end position in connection to the position of the bearing 8. When the rack takes this position, the sector 2 is turned so that the valve is either completely closed or completely open.

An axially compressible spring is arranged so that one end is supported by a surface which is fixed in relation to the toothed rack 3. This surface is the end surface of the nut 5 in the embodiment shown. The other end of spring 9 operates against a supporting surface 10 fixed axially in the housing 7 when the rack approaches its end position. In the embodiment shown, this surface is an axial extension of a seat bushing for the bearing 8. Thereby the spring 9 is compressed when the rack moves towards the end position close to it, whereby the spring urges the rack with a force directed away from the supporting surface when the rack is in its end position. When the spring 9 is arranged in the bore of the toothed rack, it is guided sidways and it can be compressed by the fact that the supporting surface 10 is arranged on a member which is at least partly insertable into the bore. In order to avoid too great friction losses and torque stresses by the rotating surface 10 directly contacting the spring 9, a thrust bearing 11 can be arranged between the spring 9 and the surface 10.

The spring 9 acts as a shock absorber when the rack reaches its end position since it takes up a portion of the force which generates a torque on the cog sector 2, whereby the force decreases by which a supporting surface 12 on the sector strikes the adjustable stop screw 13 which defines the end position. The mechanism can be locked in the end position, e.g., by preventing the screw from rotating by suitable means. By the pre-load of the spring 9 any possible play between the threads of the screw 4 and the nut 5 is eliminated, whereby the vibration sensibility of the device is diminished.

When the mechanism is to be put in motion from the end position, the spring force co-acts with the torque of the motor (the screw is now rotated in the opposite sense), whereby the force available for displacing the toothed rack 3 corresponds to the maximum torque of the motor 6 plus the force developed by the spring 9. The last mentioned force is comparatively great. Its maximum value can, if no special measures are taken, be expected to give a torque on the cog sector which makes up the difference between the maximum torque of the motor 6 and the generally moderate torque which is required to maintain the motion of the device against the end position before the spring 8 starts being compressed.

The invention is suitable also for use in embodiments other than the one just described. For example, the mechanism may comprise two end positions with one spring device for each one. Further, the linearly moveable member 3 may directly influence a linearly operable valve or other device which is to be controlled, whereby the member 3 does not have to be a toothed rack. The linear displacement can be carried out by means other than screw or nut, e.g., by hydraulic, pneumatic or electromagnetic means.

I claim:

1. A motion transmitting mechanism comprising a linearly movable member (3, 5) which is displaceable by an external driving member (4, 6) between limit positions including a rest limit position at a fixed end stop having a fixed supporting surface (10) and which is driving a control member (2), said linearly movable member (3, 5) comprising a toothed rack (3) having a bore extending in the direction of movement of the rack, a rotatable screw (4) extending through the bore and co-operating with a threaded nut in the rack; an axially compressible spring (9) completely housed in said bore, and arranged so that the spring is compressed in said bore against the supporting surface when the movable member moves towards the rest limit position said axially fixed supporting surface (10) being arranged on a member which is at least partly engageable in said bore when said movable member is at said rest limit position, said spring urging the movable member with a purely axially directed force when the movable member is situated in its rest limit position at the end stop said motion transmitting mechanism including a thrust bearing movably mounted at one end of the bore of the rack facing the supporting surface, said spring disposed between said thrust bearing and nut.

* * * * *